United States Patent (10) Patent No.: US 7,509,365 B2
Curran et al. (45) Date of Patent: Mar. 24, 2009

(54) INVERTING DATA ON RESULT BUS TO PREPARE FOR INSTRUCTION IN THE NEXT CYCLE FOR HIGH FREQUENCY EXECUTION UNITS

(75) Inventors: Brian William Curran, Saugerties, NY (US); Ashutosh Goyal, Austin, TX (US); Michael Thomas Vaden, Austin, TX (US); David Allan Webber, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 11/056,894

(22) Filed: Feb. 11, 2005

(65) Prior Publication Data

US 2006/0184773 A1 Aug. 17, 2006

(51) Int. Cl.
*G06F 7/38* (2006.01)
(52) U.S. Cl. ...................................... 708/490; 712/226
(58) Field of Classification Search ................ 708/490, 708/523, 603; 712/226
See application file for complete search history.

(56) References Cited

U.S. PATENT DOCUMENTS

| 6,519,621 | B1* | 2/2003 | Yano ........................... 708/603 |
| 2006/0129623 | A1* | 6/2006 | Uesugi ........................ 708/490 |
| 2006/0174094 | A1* | 8/2006 | Lloyd et al. .................. 712/226 |

* cited by examiner

*Primary Examiner*—Chuong D Ngo
(74) *Attorney, Agent, or Firm*—Diona Gerhardt; Jack V. Musgrove

(57) ABSTRACT

A method of operating an arithmetic logic unit (ALU) by inverting a result of an operation to be executed during a current cycle in response to control signals from instruction decode logic which indicate that a later operation will require a complement of the result, wherein the result is inverted during the current cycle. The later operation may be a subtraction operation that immediately follows the first operation. The later instruction is decoded prior to the current cycle to control the inversion in the ALU. The ALU includes an adder, a rotator, and a data manipulation unit which invert the result during the current cycle in response to an invert control signal. The second operation subtracts the result during a subsequent cycle in which a carry control signal to the adder is enabled, and the rotator and the data manipulation unit are disabled. The ALU may be used in an execution unit of a microprocessor, such as a fixed-point unit.

1 Claim, 4 Drawing Sheets

INVERTING DATA ON RESULT BUS TO PREPARE FOR INSTRUCTION IN THE NEXT CYCLE FOR HIGH FREQUENCY EXECUTION UNITS

BACKGROUND OF THE INVENTION

1. Field of the Invention

The present invention generally relates to computer systems, particularly microprocessors having execution units such as fixed-point units or floating point units, and more specifically to an arithmetic logic unit which carries out addition and subtraction operations.

2. Description of the Related Art

High-performance computer systems typically use multiple processors to carry out the various program instructions embodied in computer programs such as software applications and operating systems. A conventional microprocessor design is illustrated in FIG. 1. Processor 10 is generally comprised of a single integrated circuit superscalar microprocessor, and includes various execution units, registers, buffers, memories, and other functional units which are all formed by integrated circuitry. Processor 10 may operate according to reduced instruction set computing (RISC) techniques, and is coupled to a system or fabric bus 12 via a bus interface unit (BIU) 14 within processor 10. BIU 14 controls the transfer of information between processor 10 and other devices coupled to system bus 12, such as a main memory, by participating in bus arbitration. Processor 10, system bus 12, and the other devices coupled to system bus 12 together form a host data processing system.

BIU 14 is connected to an instruction cache and memory management unit (MMU) 16, and to a data cache and MMU 18 within processor 10. High-speed caches, such as those within instruction cache and MMU 16 and data cache and MMU 18, enable processor 40 to achieve relatively fast access time to a subset of data or instructions previously transferred from main memory to the caches, thus improving the speed of operation of the host data processing system. Instruction cache and MMU 16 is further coupled to a sequential fetcher 20, which fetches instructions for execution from instruction cache and MMU 16 during each cycle. Sequential fetcher 20 transmits branch instructions fetched from instruction cache and MMU 16 to a branch prediction unit 22 for calculating the next instruction fetch address, but temporarily stores sequential instructions within an instruction queue 24 for execution by other execution circuitry within processor 10.

The execution circuitry of processor 10 has multiple execution units for executing sequential instructions, including one or more fixed-point units (FXUs) 26, load-store units (LSUs) 28, floating-point units (FPUs) 30, and branch processing units (BPUs) 32. These execution units 26, 28, 30, and 32 execute one or more instructions of a particular type of sequential instructions during each processor cycle. For example, FXU 26 performs fixed-point mathematical and logical operations such as addition, subtraction, shifts, rotates, and XORing, utilizing source operands received from specified general purpose registers (GPRs) 34 or GPR rename buffers 36. Following the execution of a fixed-point instruction, FXUs 26 output the data results of the instruction to GPR rename buffers 36, which provide temporary storage for the operand data until the instruction is completed by transferring the result data from GPR rename buffers 36 to one or more of GPRs 34. FPUs 30 perform single and double-precision floating-point arithmetic and logical operations, such as floating-point multiplication and division, on source operands received from floating-point registers (FPRs) 38 or FPR rename buffers 40. FPU 30 outputs data resulting from the execution of floating-point instructions to selected FPR rename buffers 40, which temporarily store the result data until the instructions are completed by transferring the result data from FPR rename buffers 40 to selected FPRs 38. LSUs 28 execute floating-point and fixed-point instructions which either load data from memory (i.e., either the data cache within data cache and MMU 18 or main memory) into selected GPRs 34 or FPRs 38, or which store data from a selected one of GPRs 34, GPR rename buffers 36, FPRs 38, or FPR rename buffers 40 to system memory. BPUs 32 perform condition code manipulation instructions and branch instructions.

Processor 10 may employ both pipelining and out-of-order execution of instructions to further improve the performance of its superscalar architecture, but the present invention is particularly advantageous when used with in-order program execution or in cases where out-of-order execution capabilities are limited. For out-of-order processing, instructions can be executed by FXUs 26, LSUs 28, FPUs 30, and BPUs 32 in any order as long as data dependencies are observed. In addition, instructions may be processed by each of the FXUs 26, LSUs 28, FPUs 30, and BPUs 32 at a sequence of pipeline stages, in particular, five distinct pipeline stages: fetch, decode/dispatch, execute, finish, and completion.

During the fetch stage, sequential fetcher 20 retrieves one or more instructions associated with one or more memory addresses from instruction cache and MMU 16. Sequential instructions fetched from instruction cache and MMU 16 are stored by sequential fetcher 20 within instruction queue 24. Sequential fetcher 10 folds out branch instructions from the instruction stream and forwards them to branch prediction unit 22 for handling. Branch prediction unit 22 includes a branch prediction mechanism, which may comprise a dynamic prediction mechanism such as a branch history table, that enables branch prediction unit 22 to speculatively execute unresolved conditional branch instructions by predicting whether or not the branch will be taken.

During the decode/dispatch stage, instruction dispatch unit (IDU) 42 decodes and dispatches one or more instructions from instruction queue 24 to execution units 26, 28, 30, and 32. In addition, dispatch unit 42 allocates a rename buffer within GPR rename buffers 36 or FPR rename buffers 40 for each dispatched instruction' result data. Upon dispatch, instructions are also stored within the multiple-slot completion buffer of completion unit 44 to await completion. Processor 10 tracks the program order of the dispatched instructions during out-of-order execution utilizing unique instruction identifiers.

During the execute stage, execution units 26, 28, 30, and 32, execute instructions received from dispatch unit 42 opportunistically as operands and execution resources for the indicated operations become available. Each of execution units 26, 28, 30, and 32, are preferably equipped with a reservation station that stores instructions dispatched to that execution unit until operands or execution resources become available. After execution of an instruction has terminated, execution units 26, 28, 30, and 32, store data results, if any, within either GPR rename buffers 36 or FPR rename buffers 40, depending upon the instruction type. Then, execution units 26, 28, 30, and 32, notify completion unit 44 which instructions have finished execution. Finally, instructions are completed in program order out of the completion buffer of completion unit 44. Instructions executed by FXUs 26 and FPUs 30 are completed by transferring data results of the instructions from GPR rename buffers 36 and FPR rename buffers 40 to GPRs 34 and FPRs 38, respectively. Load and store instructions executed by LSUs 28 are completed by transferring the finished instructions to a completed store queue or a completed load queue from which the indicated load/store operations will be performed.

During the processing of program instructions, it is common to have a situation wherein the results of one operation are needed for the next instruction as an operand, in back-to-back cycles. This situation may be understood with reference to the following example of two instructions, an add operation followed by a subtract operation:

add r3, r1, r2
subf r5, r3, r4.

In the first instruction, the values in registers 1 and 2 (r1 and r2) are added and the sum is loaded into register 3 (r3). In the second instruction, the value in register 3 (r3) is subtracted from the value in register 4 (r4) and the difference is loaded into register 5 (r5). These instructions may be executed by an arithmetic logic unit (ALU) in either of the FXUs 26 or FPUs 30 of processor 10. The second instruction thus has a dependency on the first instruction, and if the first operation cannot be completed within a single cycle, the second operation must stall its execution, adversely affecting the overall performance of the processor.

As the operating frequencies of these machines increase, it is desirable to add more levels of logic to an execution unit to further enhance computation power and overall speed. However, the traditional method of generating the needed operands for later, dependent instructions limits the number of levels of logic in a pipeline stage, given the timing constraints. FIG. 2 shows a traditional implementation for an ALU 50 wherein the true and complement of an operand are generated and multiplexed for input into the ALU. The ALU includes an adder, a rotator, and a data manipulation unit. When a first instruction completes (such as an add operation) the result is issued to a result bus 52 that is connected to one of the inputs of a first operand multiplexer 54a and a second operand multiplexer 54b. After that operation completes, the next instruction is decoded by control logic 56 to determine the type of operation in the pipeline. If the current result is to be one of the operands for the next instruction, multiplexer 54a selects the result bus for input and passes the previous result to a latch 58. Latch 58 has two outputs, one connected to a first input of another multiplexer 62, and the other connected to an inverter 60 whose output feeds the second input of multiplexer 62. In this manner, multiplexer 62 can selectively output either the true or complement of the previous result to ALU 50 responsive to the control signal from control logic 56.

The operands and the control signals are both generated in the same cycle, synchronized by the E-latches, but because the design is datapath limited, ALU 50 has to wait while multiplexer 62 selects between the true and complement of operand. This logic delay is particularly troublesome when trying to design high frequency execution units, e.g., one gigahertz or higher. It would, therefore, be desirable to devise an alternative method to generating and multiplexing the true and complement in such a way that this latency is eliminated. It would be further advantageous if the method could make the overall datapath faster to facilitate higher frequency constructions.

SUMMARY OF THE INVENTION

It is therefore one object of the present invention to provide an improved method of operating an arithmetic logic unit.

It is another object of the present invention to provide such a method that eliminates the traditional latency associated with a dependent instruction which must select between the true and complement of a previous instruction result.

It is yet another object of the present invention to provide a high-frequency execution unit for a microprocessor which has a faster datapath flow.

The foregoing objects are achieved in a method of operating an arithmetic logic unit (ALU), by issuing a first operation to the ALU to be executed during a current cycle to yield a result, determining that a second operation which follows the first operation will require a complement of the result (prior to executing the first operation), and inverting the result during the current cycle in response to this determination. The second operation may be a subtraction operation that immediately follows the first operation. The instruction associated with the second operation is decoded prior to the current cycle to control the inversion in the ALU. In the illustrative embodiment, the ALU includes an adder, a rotator, and a data manipulation unit which invert the result during the current cycle in response to an invert control signal. Then, the second operation subtracts the result during a subsequent cycle in which a carry control signal to the adder is enabled, and the rotator and the data manipulation unit are disabled. The ALU is particularly suited for use an a fixed-point execution unit.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
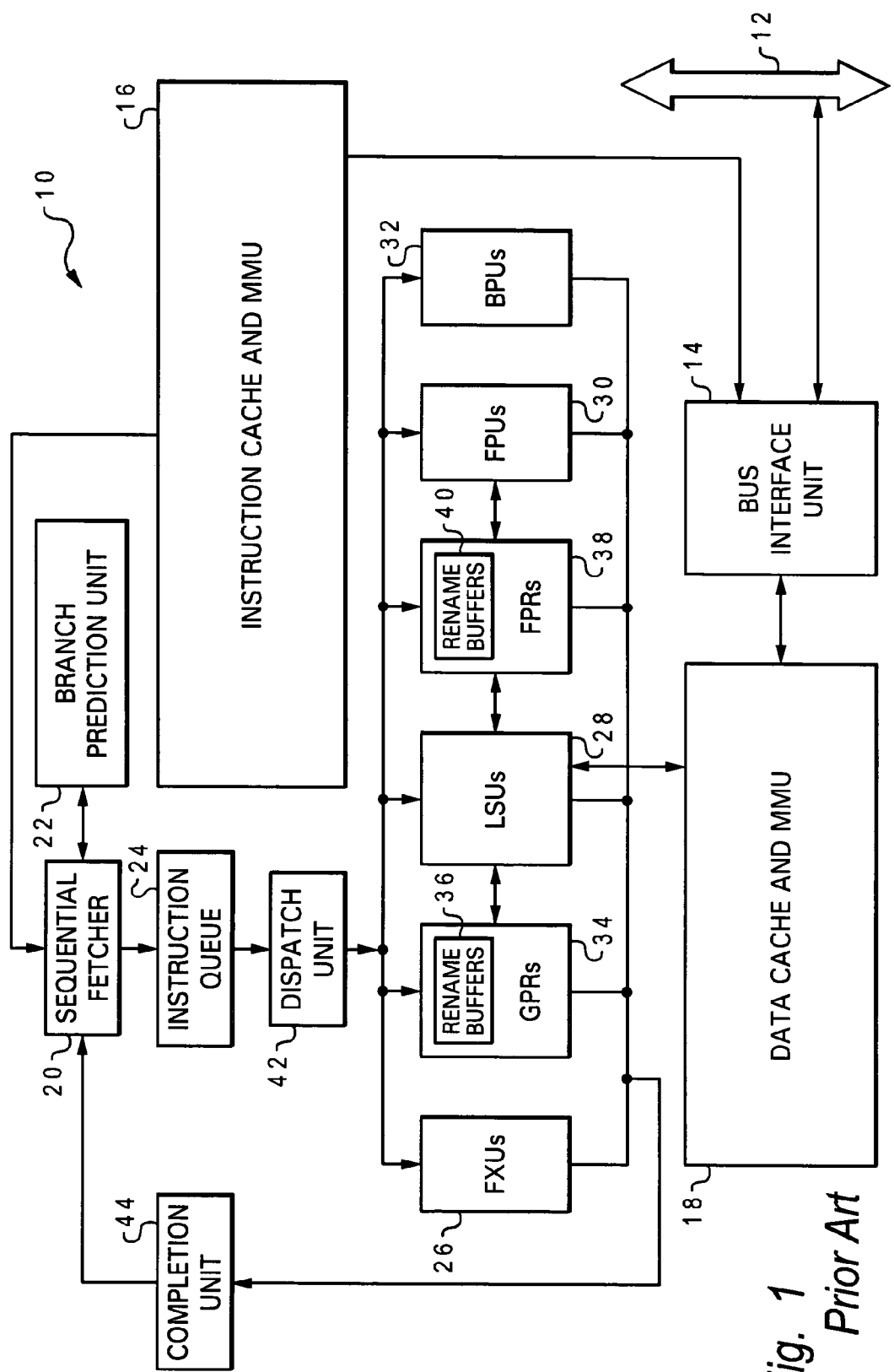
FIG. 1 is a block diagram of a conventional microprocessor having various execution units including fixed-point units and floating-points units.
Figure 2:
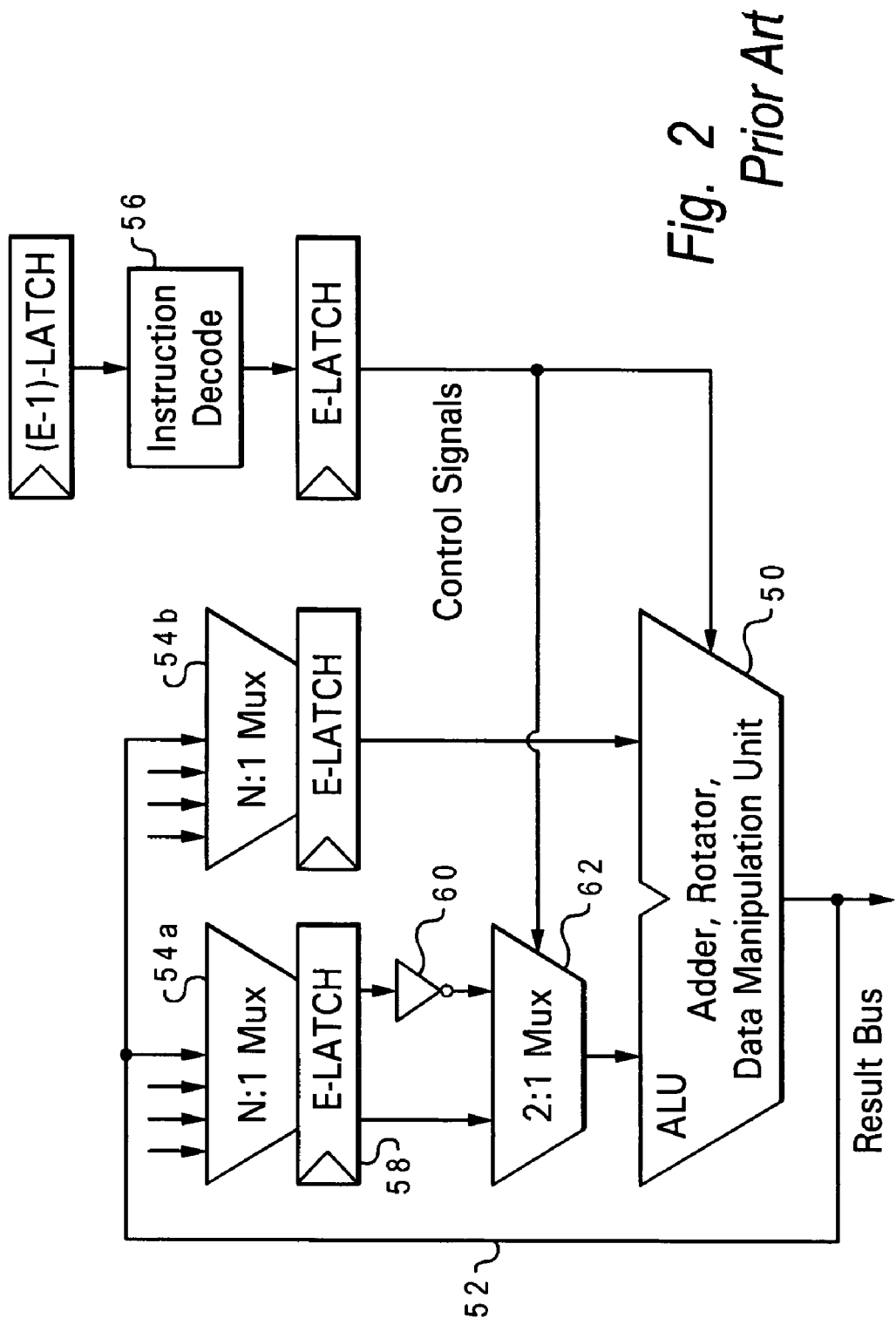
FIG. 2 is a high-level schematic diagram of a conventional interface for an arithmetic logic unit which may be used in an execution unit of the microprocessor of FIG. 1.
Figure 3:
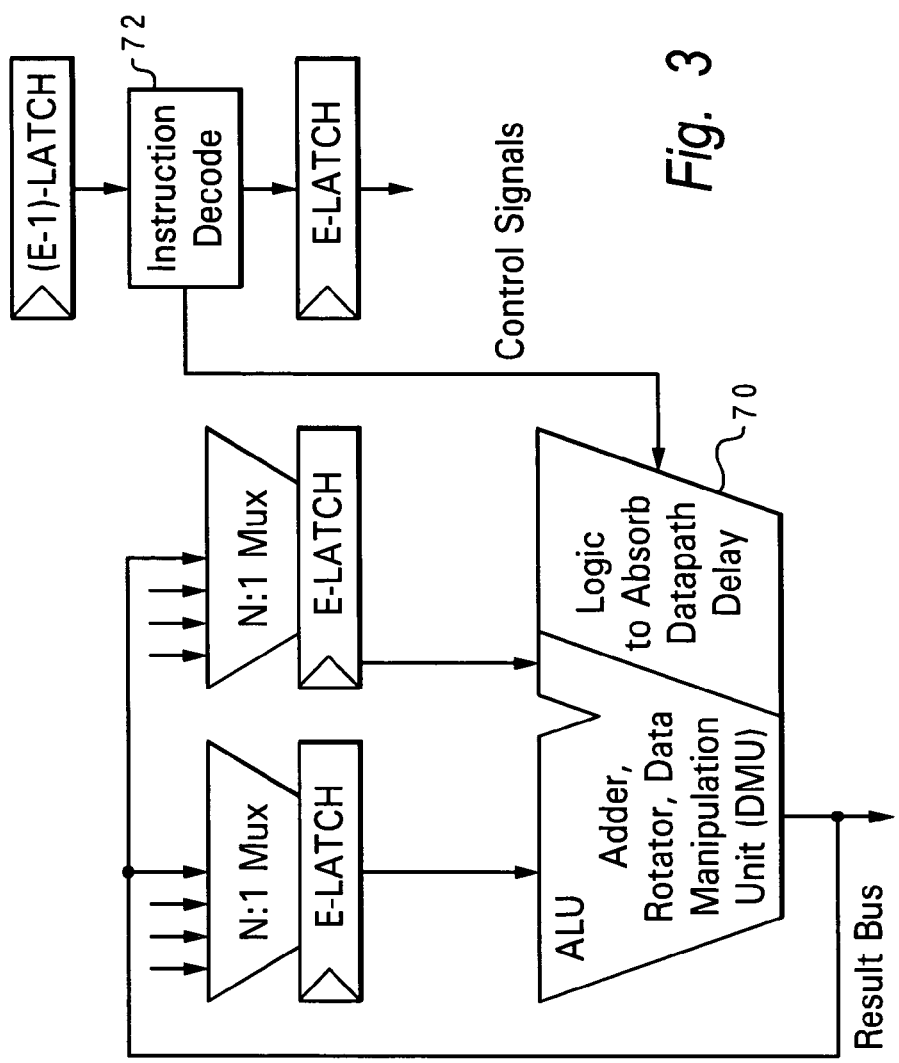
FIG. 3 is a high-level schematic diagram of an interface for an arithmetic logic unit constructed in accordance with one embodiment of the present invention.

With reference now to the figures, and in particular with reference to FIG. 3, there is depicted one embodiment of an interface for an arithmetic logic unit constructed in accordance with the present invention. As explained further below, arithmetic logic unit (ALU) 70 contains logic which supplants the traditional means for generating and multiplexing the true and complement of a result of the previous operation, when that result is necessary for a subsequent (dependent) instruction. Accordingly, the interface of FIG. 3 lacks the extra logic levels seen in FIG. 1 (inverter 60 and multiplexer 62). ALU 70 is able to output a result to the operand inputs which is a true or complement based on a control signal which is received prior to execution of the initial instruction. The control signal is issued from instruction decode logic 72 and is based on the nature of the following instruction, i.e., the control signal from the next instruction is available early in the present cycle. If the previous result is to be subtracted in the next instruction, then ALU 70 outputs the complement of the result to the result bus rather than outputting the true of the result.

ALU 70 is particularly useful for an execution unit of a microprocessor, such as a fixed-point unit. Other features of the execution unit (such as multipliers, normalizers, etc.) will become apparent to those skilled in the art.

Figure 4:
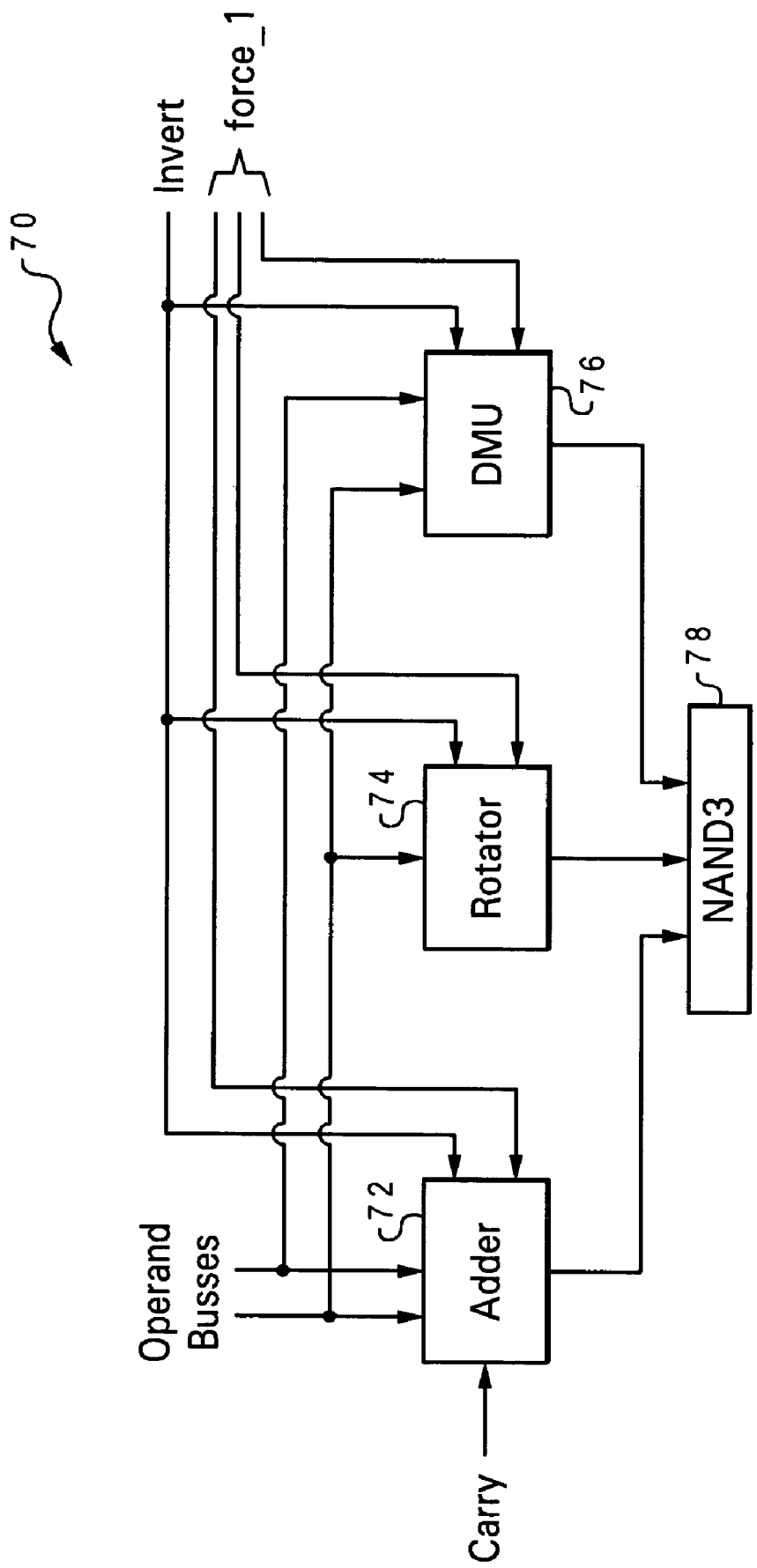
FIG. 4 is a schematic diagram of one embodiment of the arithmetic logic unit of FIG. 3 constructed in accordance with the present invention.

As further shown in FIG. 4, the ALU of the present invention absorbs the logic delay of the prior art datapath in its main operation. Instruction decode logic 72 sends three control signals to ALU 70, including an invert signal, a force_1 signal, and a carry signal. The invert and force_1 signals selectively control each of an adder 72, a rotator 74, and a data manipulation unit (DMU) 76. The carry signal is provided only to adder 72. Each of the two operand inputs are connected to adder 72, rotator 74, and DMU 76. The outputs of adder 72, rotator 74, and DMU 76 are each connected to an input of a 3-way NAND gate 78.

The decode of the control signals is generated early in a previous cycle to allow ALU 70 to output a true or complement result in the current cycle. This ability is especially useful for a subtraction operation that is dependent on the previous instruction, which may again be understood with reference to the following example of two instructions:

add r3, r1, r2
subf r5, r3, r4.

The r3 result in the present ADD cycle is needed for the next SUBF cycle. In such a case, the r3 result is inverted in the present cycle using the invert control signal and fed back to the multiplexers and latch registers for the SUBF instruction in the next cycle. Adder 72 may be a carry lookahead (CLA) adder, and the inversion is performed by inserting a gate in the sum path of the addition, outside the critical path that includes the CLA logic. Since the worst delay is through the CLA logic, inclusion of another gate does not affect the overall adder speed. In the next cycle, the carry signal is set to logic 1, which will compute the 2's complement of r3 that is in turn used to compute the 1's complement of [r3+carry+r4] to store in r5. So instead of generating the results based on control signals from the instruction of the current cycle, the present invention looks ahead and prepares for the next instruction by feeding the appropriately inverted operand. Since only the adder is active during the next cycle, the force_1 signal is turned on to disable the outputs of the rotator and the DMU, by forcing a "1" to all bits (this effectively disables the outputs since a NAND gate is used as an output multiplexer). In this manner, the inversion is accomplished without introducing delay to the add or the rotate, making the overall datapath faster, and leading to a higher frequency design.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention is particularly useful for fixed-point units, it is also applicable to floating-point units or any logic circuit performing successive arithmetic operations and not limited to general purpose microprocessors. It is therefore contemplated that such modifications can be made without departing from the spirit or scope of the present invention as defined in the appended claims.

What is claimed is:

1. A method of operating an arithmetic logic unit to eliminate latency associated with a dependent instruction which must select between a true and a complement of a previous instruction result, comprising:

issuing a first operation to the arithmetic logic unit to be executed during a current cycle to yield a result;

determining that a subtraction operation which immediately follows the first operation will require a complement of the result, prior to executing the first operation within the arithmetic logic unit, by decoding an instruction associated with the subtraction operation prior to the current cycle using instruction decode logic;

sending an invert control signal to an adder, a rotator, and a data manipulation unit of the arithmetic logic unit from the instruction decode logic in response to said determining;

inverting the result during the current cycle using the adder, the rotator, and the data manipulation unit in response to the invert control signal; and subtracting the result during a cycle subsequent to the current cycle in which a carry control signal to the adder is enabled, and the rotator and the data manipulation unit are disabled.

* * * * *